United States Patent [19]

Gugumus

[11] Patent Number: 5,037,870
[45] Date of Patent: Aug. 6, 1991

[54] STABILIZATION OF ORGANIC POLYMERS AGAINST DEGRADATION BY LIGHT

[75] Inventor: Francois Gugumus, Allschwil, Switzerland

[73] Assignee: Ciba-Geigy Corporation, Ardsley, N.Y.

[21] Appl. No.: 569,491

[22] Filed: Aug. 20, 1990

Related U.S. Application Data

[63] Continuation of Ser. No. 436,119, Nov. 13, 1989, abandoned, which is a continuation of Ser. No. 186,836, Apr. 27, 1988, abandoned.

[30] Foreign Application Priority Data

May 5, 1987 [CH] Switzerland .......................... 1709/87

[51] Int. Cl.⁵ .......................... C08K 5/05; C08K 5/09; C08K 5/22; C08K 5/3435
[52] U.S. Cl. .................................... 524/102; 524/327; 524/381; 524/382; 524/399; 524/400; 524/432; 524/433; 524/436
[58] Field of Search ............... 524/102, 399, 400, 432, 524/433, 436

[56] References Cited

U.S. PATENT DOCUMENTS 4,202,816 5/1980 Moser et al. .................... 524/102
4,233,412 11/1980 Rody et al. ..................... 525/167
4,256,627 3/1981 Moser et al. .................... 524/102

FOREIGN PATENT DOCUMENTS 2132621 7/1984 United Kingdom .

Primary Examiner—Kriellion S. Morgan
Attorney, Agent, or Firm—Stephen V. O'Brien

[57] ABSTRACT

The invention relates to the stabilization of organic polymers against degradation by light by the addition of (a) a light stabilizer of the formula

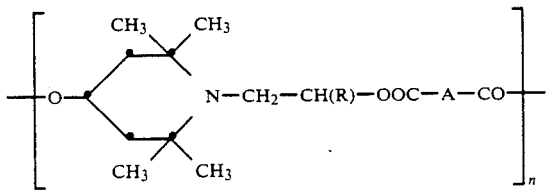

in which R is hydrogen or methyl and A is an alkylene radical, and (b) an oxide, hydroxide, carboxylate, enolate or phenate of magnesium or zinc.

8 Claims, No Drawings

STABILIZATION OF ORGANIC POLYMERS AGAINST DEGRADATION BY LIGHT

This application is a continuation of application Ser. No. 436,119, filed 11/13/89 now abandoned, which is a continuation of Ser. No. 186,836 filed on 4/27/88, now abandoned.

The invention relates to the stabilization of organic polymers against degradation by light by adding a mixture composed of a special polyalkylpiperidine derivative and a magnesium or zinc compound.

It is known that the light-stabilizing action of polyalkylpiperidine stabilizers can be increased by adding metal compounds. Thus complexes of various low-molecular polyalkylpiperidines with metal compounds, for example nickel, cobalt, manganese or magnesium acetylacetonate, nickel laurate or oenanthate, zinc laurate or zinc acetate have been described in U.S. Pat. No. 4,202,816. Similar mixtures of polymeric polyalkylpiperidines and metal compounds are described in U.S. Pat. No. 4,256,627, nickel acetate and laurate, zinc oenanthate and nickel and cobalt acetylacetonate being mentioned as examples of metal compounds. It has been found that certain polyesters containing tetramethylpiperidine groups, mixed with magnesium or zinc compounds, exhibit a particularly pronounced synergism in the stabilization of organic polymers against degradation by light. The invention relates, therefore, to an organic polymer containing, as the stabilizer against degradation by light:

a) a polyalkylpiperidine light stabilizer of the formula I

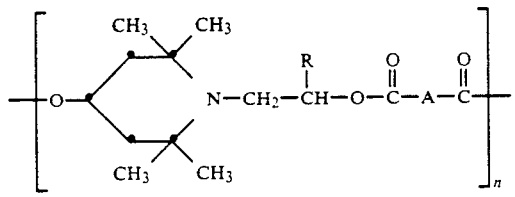

in which R is hydrogen or methyl, A is an unbranched or branched alkylene radical having 2 to 10 C atoms and n has a value of 2–50, and b) a magnesium or zinc compound from the series comprising oxides, hydroxides, carboxylates, enolates or phenates, the component (b) not being an oxide or hydroxide of Mg or Zn in the case of polyethylene.

The following are examples of suitable organic polymers which can be stabilized in accordance with the invention:

1. Polymers of monoolefins and diolefins, for example polypropylene, polyisobutylene, polybut-1-ene, polymethylpent-1-ene, polyisoprene or polybutadiene, and also polymers of cycloolefins, for example cyclopentene or norbornene; and also polyethylene (which can be crosslinked or non-crosslinked), for example high-density polyethylene (HDPE), low-density polyethylene (LDPE) or linear, low-density polyethylene (LLDPE).

2. Mixtures of the polymers mentioned under 1), for example mixtures of polypropylene with polyisobutylene, polypropylene with polyethylene (for example PP/HDPE or PP/LDPE) and mixtures of different types of polyethylene (for example LDPE/HDPE).

3. Copolymers of monoolefins and diolefins with one another or with other vinyl monomers, for example ethylene/propylene copolymers, linear, low-density polyethylene (LLDPE) and mixtures thereof with low-density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers or ethylene/acrylic acid copolymers and salts thereof (ionomers), and also terpolymers of ethylene with propylene and a diene, such as hexadiene, dicyclopentadiene or ethylidenenorbornene; and also mixtures of such copolymers with one another and with polymers mentioned under 1), for example polypropylene-ethylene/propylene copolymers, LDPE-ethylene/vinyl acetate copolymers, LDPE-ethylene/acrylic acid copolymers, LLDPE-ethylene/vinyl acetate copolymers and LLDPE-ethylene/acrylic acid copolymers.

3a. Hydrocarbon resins (for example $C_5$–$C_9$), including hydrogenated modifications thereof (for example tackifier resins).

4. Polystyrene, poly-(p-methylstyrene) or poly-(α-methylstyrene).

5. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/maleic anhydride or styrene/acrylonitrile/methyl acrylate; high-impact strength mixtures composed of styrene copolymers and another polymer, for example a polyacrylate, a diene polymer or an ethylene/propylene/diene terpolymer; and block copolymers of styrene, for example styrene/butadiene/styrene, styrene/isoprene/styrene, styrene/ethylene-butylene/styrene or styrene/ethylene-propylene/styrene.

6. Graft copolymers of styrene or α-methylstyrene, for example styrene on polybutadiene, styrene on polybutadiene/styrene copolymers or polybutadiene/acrylonitrile copolymers or styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates or styrene and acrylonitrile on acrylate/butadiene copolymers and mixtures thereof with the copolymers mentioned under 5), such as are known, for example, as so-called ABS, MBS, ASA or AES polymers.

7. Halogen-containing polymers, for example polychloroprene, chlorinated rubber, chlorinated or chlorosulfonated polyethylene, epichlorohydrin homopolymers and copolymers and, in particular, polymers formed from halogen-containing vinyl compounds, for example polyvinyl chloride, polyvinylidene chloride, polyvinyl fluoride or polyvinylidene fluoride; and copolymers thereof, such as vinyl chloride/vinylidene chloride, vinyl chloride/vinyl acetate or vinylidene chloride/vinyl acetate.

8. Polymers derived from α,β-unsaturated acids and derivatives thereof, such as polyacrylates and polymethacrylates, polyacrylamides and polyacrylonitriles.

9 Copolymers of the monomers mentioned under 8) with one another or with other unsaturated monomers, for example acrylonitrile/butadiene copolymers, acrylonitrile/alkyl acrylate copolymers, acrylonitrile/alkoxyalkyl acrylate copolymers, acrylonitrile/vinyl halide copolymers or acrylonitrile/alkyl methacrylate/butadiene terpolymers.

10. Polymers derived from unsaturated alcohols and amines or acyl derivatives or acetals thereof, such as polyvinyl alcohol, polyvinyl acetate, stearate, benzoate or maleate, polyvinyl butyral, polyallyl phthalate or polyallylmelamine; and copolymers thereof with olefins mentioned in item 1.

11. Homopolymers and copolymers of cyclic ethers, such as polyalkylene glycols, polyethylene oxide, polypropylene oxide or copolymers thereof with bisglycidyl ethers.

12. Polyacetals, such as polyoxymethylene and polyoxymethylenes containing comonomers, for example ethylene oxide; polyacetals which have been modified with thermoplastic polyurethanes, acrylates or MBS.

13. Polyphenylene oxides and sulfides and mixtures thereof with styrene polymers or polyamides.

14. Polyurethanes derived from polyethers, polyesters and polybutadienes having terminal hydroxyl groups on the one hand and aliphatic or aromatic polyisocyanates on the other, as well as their precursors.

15. Polyamides and copolyamides derived from diamines and dicarboxylic acids and/or aminocarboxylic acids or the corresponding lactams, such as polyamide 4, polyamide 6, polyamide 6,6, 6,10, 6,9, 6,12 and 4,6, polyamide 11, polyamide 12 and aromatic polyamides prepared from m-xylene, a diamine and adipic acid; polyamides prepared from hexamethylenediamine and isophthalic and/or terephthalic acid and, if appropriate, an elastomer as modifier, for example poly-2,4,4-trimethylhexamethylene terephthalamide and poly-m-phenylene isophthalamide. Block copolymers of the polyamides mentioned above with polyolefins, olefin copolymers, ionomers or chemically linked or grafted elastomers; or polyethers, for example polyethylene glycol, polypropylene glycol or polytetramethylene glycol. Also polyamides or copolyamides modified with EPDM or ABS; and polyamides which have been subjected to condensation during processing ("RIM polyamide systems").

16. Polyureas, polyimides, polyamide-imides and polybenzimidazoles.

17. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates and block polyetheresters derived from polyethers having hydroxyl end groups; and also polyesters modified with polycarbonates or MBS.

18. Polycarbonates and polyester-carbonates.

19. Polysulfones, polyether-sulfones and polyether-ketones.

20. Crosslinked polymers derived from aldehydes on the one hand and from phenols, urea or melamine on the other hand, such as phenol/formaldehyde, urea/formaldehyde and melamine/formaldehyde resins.

21. Drying and non-drying alkyd resins.

22. Unsaturated polyester resins derived from copolyesters of saturated and unsaturated dicarboxylic acids with polyhydric alcohols and with vinyl compounds as crosslinking agents, and also halogen-containing modifications thereof of low combustibility.

23. Crosslinkable acrylic resins derived from substituted acrylic acid esters, for example from epoxy-acrylates, urethane-acrylates or polyester-acrylates.

24. Alkyd resins, polyester resins and acrylate resins crosslinked with melamine resins, urea resins, polyisocyanates or epoxide resins.

25. Crosslinked epoxide resins derived from polyepoxides, for example from bisglycidyl ethers or cycloaliphatic diepoxides.

26. Natural polymers, such as cellulose, natural rubber, gelatine and polymer-homologously chemically modified derivatives thereof, such as cellulose acetates, propionates and butyrates, and the cellulose ethers, such as methylcellulose; and also colophony resins and derivatives.

27. Mixtures (polyblends) of the abovementioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP and PA/PPO.

Synthetic polymers, particularly thermoplastics and above all polyolefins, in particular polypropylene, are preferred.

The polyalkylpiperidine light stabilizers of the formula I are described in U.S. Pat. No. 4,233,412. The radical A can be, for example, dimethylene, trimethylene, tetramethylene, hexamethylene, octamethylene or decamethylene, 1,2-propylene, 1,2-butylene, 1,1,3-trimethyltetramethylene or 2,2-di-methyltrimethylene.

It is preferable to use as the light stabilizer a polyester of the formula Ia

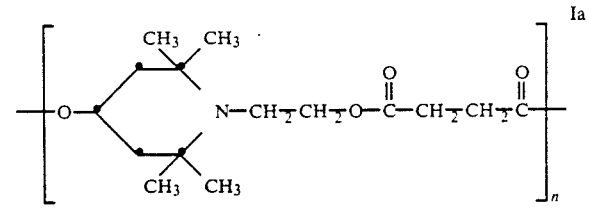

in which n has a value of 5-20.

The compounds of the formula I are prepared by subjecting 1-(2-hydroxyethyl)-2,2,6,6-tetramethylpiperidin-4-ol or 1-(2-hydroxypropyl)-2,2,6,6-tetramethylpiperidin-4-ol to polycondensation with a dicarboxylic acid HOOC-A-COOH or an acid chloride or dialkyl ester thereof. A mixture of polyesters having different degrees of polycondensation n is formed in this reaction. The value n determined for a mixture of this type therefore represents an average value. It can be 2-50 and is preferably 5-20.

The magnesium and zinc compounds which can be used as the component (b) can be oxides, hydroxides, carboxylates, enolates or phenates of Mg or Zn. The carboxylates can, in particular, be salts of aliphatic or aromatic monocarboxylic or dicarboxylic acids and can, if appropriate, be substituted by hydroxyl. The salts of aliphatic $C_1$-$C_{20}$monocarboxylic acids and of aromatic $C_6$–$C_{12}$ monocarboxylic acids are preferred. Examples of carboxylates are formates, acetates, propionates, caproates, oenanthates, caprylates, laurates, palmitates, stearates, behenates, oleates, oxalates, succinates, glutarates, adipates, sebacates, maleates, citrates, tartrates, benzoates or salicylates. The carboxylates can also be salts of technical mixtures of fatty acids.

Suitable enolates are, in particular, enolates of β-dicarbonyl compounds having 5–20 C atoms. Examples of enolates are the Mg or Zn compounds of acetylacetone, benzoylacetone, dibenzoylmethane, methyl acetoacetate or ethyl acetoacetate. Examples of phenates are Mg and Zn compounds of phenol, cresol, xylenol, phenols of a higher degree of alkylation or O-acetylphenol.

It is also possible to use mixtures of such compounds. It is preferable to use as the component (b) an oxide or acetylacetonate or the salt of an aliphatic monocarboxylic acid of magnesium or zinc. The aliphatic monocarboxylic acid preferably contains 1–20 C atoms.

The effect of the magnesium and zinc compounds is particularly surprising because the corresponding calcium compounds have virtually no synergistic action. The magnesium and zinc compounds on their own have only a slight stabilizing action or none at all, and they can therefore be regarded as co-stabilizers for polyalkylpiperidine light stabilizers.

The amount of stabilizers added depends on the particular substrate and the degree of stabilization desired. The component (a) is preferably added in an amount of 0.01 to 5% by weight, in particular 0.05 to 1% by weight, relative to the polymer. The component (b) is preferably added in an amount of 0.005 to 1% by weight, in particular 0.05 to 0.5% by weight, relative to the polymer.

The stabilizers can be added before, during or after the preparation of the polymer, but before or during the shaping of the latter. The stabilizers can, for example, be mixed with the pulverulent polymer or added to the melt of the polymer. They can also be added in the form of a master-batch containing, for example, 5–25% of stabilizer. The components (a) and (b) can be added to the polymer individually or as a mixture.

In addition to the stabilizers (a) and (b) according to the invention, it is also possible to add other stabilizers to the polymer as well, for example antioxidants of the phenol type, UV absorbers, metal deactivators, phosphites and phosphonites or peroxide-destroying compounds of the type of organic thio compounds.

The following are examples of these:

1. Antioxidants 1.1. Alkylated monophenols, for example 2,6-ditert-butyl-4-methylphenol, 2-tert-butyl-4,6-dimethylphenol, 2,6-ditert-butyl-4-ethylphenol, 2,6-ditert-butyl-4-n-butylphenol, 2,6-ditert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-ditertbutyl-4-methoxymethylphenol and 2,6-dinonyl-4-methylphenol.

1.2. Alkylated hydroquinones, for example 2,6-ditert-butyl-4-methoxyphenol, 2,5-ditert-butyl-hydroquinone, 2,5-ditert-amyl-hydroquinone and 2,6-diphenyl-4-octadecyloxyphenol.

1.3. Hydroxylated thiodiphenyl ethers, for example 2,2′-thio-bis-(6-tert-butyl- 4-methylphenol), 2,2′-thio-bis-(4-octylphenol), 4,4′-thio-bis-(6-tert-butyl-3methyl-phenol) and 4,4′-thio-bis-(6-tert-butyl-2-methylphenol).

1.4. Alkylidenebisphenols, for example 2,2′-methylene-bis-(6-tert-butyl-4-methylphenol), 2,2′-methylene-bis-(6-tert-butyl-4-ethylphenol), 2,2′-methylene-bis-[4-methyl-6-(α-methylcyclohexyl)-phenol], 2,2′-methylene-bis-(4-methyl-6-cyclohexylphenol), 2,2′-methylene-bis-(6-nonyl-4-methylphenol), 2,2′-methylene-bis-(4,6-ditert-butylphenol), 2,2′-ethylidene-bis-(4,6-di-tert-butylphenol), 2,2′-ethylidene-bis-(6-tert-butyl-4-isobutylphenol), 2,2′-methylene-bis-[6-(α-methylbenzyl)-4-nonylphenol], 2,2′-methylene-bis-[6-(α,α-dimethylbenzyl)-4-nonylphenol], 4,4′-methylene-bis-(2,6-ditert-butylphenol), 4,4′-methylene-bis-(6-tert-butyl-2-methylphenol), 1,1-bis-(5-tert-butyl-4-hydroxy-2-methylphenyl)-butane, 2,6-bis-(3-tert-butyl-5-methyl-2-hydroxybenzyl)-4-methylphenol, 1,1,3-tris-(5-tert-butyl-4-hydroxy-2-methylphenyl)-butane, 1,1-bis-(5-tert-butyl-4-hydroxy-2-methylphenyl)-3-n-dodecylmercaptobutane, ethylene glycol bis-[3,3-bis-(3′-tert-butyl-4′-hydroxyphenyl)-butyrate], bis-(3-tert-butyl-4-hydroxy-5-methylphenyl)-dicyclopentadiene and bis-[2-(3′-tert-butyl-2′-hydroxy-5′-methylbenzyl)-6-tert-butyl-4-methylphenyl]terephthalate.

1.5. Benzyl compounds, for example 1,3,5-tris-(3,5-ditert-butyl-4-hydroxy-benzyl)-2,4,6-trimethylbenzene, bis-(3,5-ditert-butyl-4-hydroxybenzyl) sulfide, isooctyl 3,5-ditert-butyl-4-hydroxybenzylmercaptoacetate, bis-(4-tert-butyl-3-hydroxy-2,6-dimethylbenzyl)dithiol terephthalate, 1,3,5-tris-(3,5-ditert-butyl-4-hydroxybenzyl) isocyanurate, 1,3,5-tris-(4-tert-butyl-3-hydroxy-2,6-dimethylbenzyl) isocyanurate, dioctadecyl 3,5-ditert-butyl-4-hydroxybenzylphosphonate, the Ca salt of monoethyl 3,5-ditert-butyl-4-hydroxybenzylphosphonate and 1,3,5-tris-(3,5-dicyclohexyl-4-hydroxybenzyl) isocyanurate.

1.6. Acylaminophenols, for example 4-hydroxylauranilide, 4-hydroxystearanilide, 2,4-bis-(octylmercapto)-6-(3,5-ditert-butyl-4-hydroxyanilino)-s-triazine and octyl N-(3,5-ditert-butyl-4-hydroxyphenyl)-carbamate.

1.7. Esters of β-(3,5-ditert-butyl-4-hydroxyphenyl)-propionic acid with monohydric or polyhydric alcohols, for example methanol, octadecanol, 1,6-hexanediol, neopentyl glycol, thiodiethylene glycol, diethylene glycol, triethylene glycol, pentaerythritol, tris-(hydroxyethyl) isocyanurate and N,N′-bis-(hydroxyethyl)-oxamide.

1.8. Esters of β-(5-tert-butyl-4-hydroxy-3-methylphenyl)-propionic acid with monohydric or polyhydric alcohols, for example methanol, octadecanol, 1,6-hexanediol, neopentyl glycol, thiodiethylene glycol, diethylene glycol, triethylene glycol, pentaerythritol, tris-(hydroxy)ethyl isocyanurate and N,N′-bis-(hydroxyethyl)-oxamide.

1.9. Esters of β-(3,5-dicyclohexyl-4-hydroxyphenyl)-propionic acid with monohydric or polyhydric alcohols, for example methanol, octadecanol, 1,6-hexanediol, neopentyl glycol, thiodiethylene glycol, diethylene glycol, triethylene glycol, pentaerythritol, tris-(hydroxy)ethyl isocyanurate and N,N′-bis-(hydroxyethyl)-oxamide.

1.10. Amides of β-(3,5-ditert-butyl-4-hydroxyphenyl)-propionic acid, for example N,N′-bis-(3,5-ditert-butyl-4-hydroxyphenylpropionyl)-hexamethylenediamine, N,N′-bis-(3,5-ditert-butyl-4-hydroxyphenylpropionyl)-trimethylenediamine and N,N′-bis-(3,5-ditert-butyl-4-hydroxyphenylpropionyl)-hydrazine.

2. UV absorbers 2.1. 2-(2′-Hydroxyphenyl)-benzotriazoles, for example the 5′-methyl, 3′, 5′-ditert-butyl, 5′-tert-butyl, 5′-

(1,1,3,3-tetramethylbutyl), 5-chloro-3',5'-ditert-butyl, 5-chloro-3'-tert-butyl-5'-methyl, 3'-sec-butyl-5'-tert-butyl, 4'-octyloxy, 3',5'-ditert-amyl and 3',5'-bis-(α,α-dimethylbenzyl) derivatives.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted or unsubstituted benzoic acids, for example 4-tert-butylphenyl salicylate, phenyl salicylate, octylphenyl salicylate, dibenzoylresorcinol, bis-(4-tert-butylbenzoyl)-resorcinol, benzoylresorcinol, 2,4-ditert-butylphenyl 3,5-ditert-butyl-4-hydroxybenzoate and hexadecyl 3,5-ditert-butyl-4-hydroxybenzoate.

2.4. Acrylates, for example ethyl or isooctylα-cyano-β,β-diphenylacrylate, methylα-carbomethoxycinnamate, methyl or butylα-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)-phenol], such as the 1:1 or 1:2 complex, if appropriate containing additional ligands, such as n-butylamine, triethanolamine or N-cyclohexyldiethanolamine, nickel dibutyldithiocarbamate, nickel salts of monoalkyl 4-hydroxy-3,5-ditert-butylbenzylphosphonates, such as the methyl or ethyl ester, nickel complexes of ketoximes, such as 2-hydroxy-4-methylphenyl undecyl ketone oxime, and nickel complexes of 1-phenyl-4-lauroyl-5-hydroxypyrazole, if appropriate containing additional ligands.

2.6. Oxamides, for example 4,4'-dioctyloxyoxanilide, 2,2'-dioctyloxy-5,5'-ditert-butyloxanilide, 2,2'-didodecyloxy-5,5'-ditert-butyloxanilide, 2-ethoxy-2'-ethyloxanilide, N,N'-bis-(3-dimethylaminopropyl)-oxamide, 2-ethoxy-5-tert-butyl-2'-ethyloxanilide and a mixture thereof with 2-ethoxy-2'-ethyl-5,4'-ditert-butyloxanilide and mixtures of o-methoxy- and p-methoxy-disubstituted oxanilides and of o-ethoxy- and p-ethoxy-disubstituted oxanilides.

3. Metal deactivators, for example N,N'-diphenyloxamide, N-salicylal-N'-salicyloylhydrazine, N,N'-bis-(salicyloyl)-hydrazine, N,N'-bis-(3,5-ditert-butyl-4-hydroxyphenylpropionyl)-hydrazine, 3-salicyloylamino-1,2,4-triazole and bis-(benzylidene)-oxalic acid dihydrazide.

4. Phosphites and phosphonites, for example triphenyl phosphite, diphenylalkyl phosphites, phenyldialkyl phosphites, tris-(nonylphenyl) phosphite, trilauryl phosphite, trioctadecyl phosphite, distearyl pentaerythritol diphosphite, tris-(2,4-ditert-butylphenyl) phosphite, diisodecylpentaerythritol diphosphite, bis-(2,4-ditert-butylphenyl)-pentaerythritol diphosphite, tris-tearylsorbitol triphosphite, tetrakis-(2,4-ditert-butylphenyl) 4,4'-biphenylenediphosphonite and 3,9-bis-(2,4-ditert-butylphenoxy)-2,4,8,10-tetraoxa-3,9-diphosphaspiro [5.5] undecane.

5. Compounds which destroy peroxides, for example esters of β-thiodipropionic acid, for example the lauryl, stearyl, myristyl or tridecyl ester, mercaptobenzimidazole, the zinc salt of 2-mercaptobenzimidazole, zinc dibutyldithiocarbamate, dioctadecyl disulfide and pentaerythritol tetrakis-(β-dodecylmercapto)-propionate.

6. Polyamide stabilizers, for example copper salts in combination with iodides and/or phosphorus compounds and salts of divalent manganese.

It is also possible to add other additives customary in plastics technology, for example pigments, fillers, reinforcing agents, lubricants, fire-retarding agents, antistatic agents, blowing agents or plasticizers.

If polyolefins are stabilized with magnesium or zinc salts, it is preferable not to add UV absorbers or pigments.

The polymers stabilized in this way can be used in a very wide variety of forms, for example as films, fibres, tapes, sheets, vessels, tubes or other profiles.

The following example illustrates the invention in greater detail. Unless otherwise stated, parts and % are by weight.

EXAMPLE 100 polypropylene powder [melt flow index 2.4 g/10 minutes (230° C., 2160 g)] are mixed in a drum mixer with 0.05 part of pentaerythrityl tetrakis-[β-(3,5-ditert-butyl-4-hydroxyphenyl)-propionate], 0.05 part of tris-(2,4-ditert-butylphenyl) phosphite, 0.1 part of Ca stearate and the amounts indicated in the tables of light stabilizers and metal compounds and the mixtures are then granulated in an extruder at a temperature of 180° to 220° C.

The resulting granules are processed in a second extruder fitted with a flat sheeting die (temperature 220° to 260° C.) to give sheeting, which is cut into tapes and then stretched at an elevated temperature in a ratio of 1:6 and wound up (gauge of the tapes: 700 to 900 denier; tensile strength: 5.5 to 6.5 g/denier).

The polypropylene tapes prepared in this way are mounted without tension on sample carriers and are subjected to weathering in Florida. After varying times groups of 5 test specimens are removed and their tensile strength is determined. The energy (in kilolangleys) which has been irradiated until the tensile strength of the tapes has fallen to 50% of its initial value is taken as a measure of the protective action of the various light stabilizers. The values obtained in 2 independent series of tests are shown in Tables 1 and 2.

A polyester of the formula

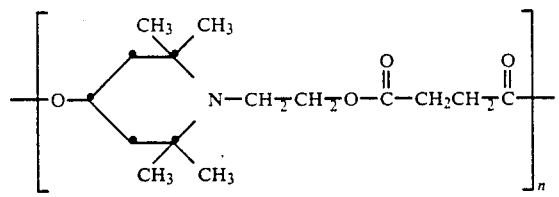

having a molecular weight number average of 3,300 is used as light stabilizer LS-1.

TABLE 1

| Light stabilizer | Metal compound | Kilolangleys (Florida) before 50% of tensile strength lost |
| --- | --- | --- |
| — | — | 23 |
| — | 0.06% of Mg acetylacetonate | 22 |
| 0.15% of LS-1 | — | 93 |
| 0.15% of LS-1 | 0.06% of Mg acetylacetonate | 145 |

TABLE 2

| Light stabilizer | Metal compound | Kilolangleys (Florida) before 50% of tensile strength lost |
| --- | --- | --- |
| — | — | 22 |
| 0.1% of LS-1 | — | 103 |
| 0.1% of LS-1 | 0.1% of Mg oxide | 124 |
| 0.1% of LS-1 | 0.1% of Zn oxide | 130 |
| 0.1% of LS-1 | 0.1% of Mg acetate | 155 |
| 0.1% of LS-1 | 0.1% of Zn acetate | 166 |
| 0.1% of LS-1 | 0.1% of Mg stearate | 141 |
| 0.1% of LS-1 | 0.1% of Zn stearate | 135 |

What is claimed is:

1. An organic polymer containing, as a stabilizer against degradation by light, (a) a polyalkylpiperidine light stabilizer of the formula I

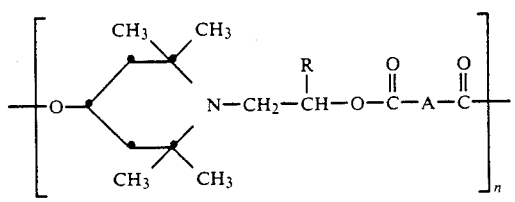

in which R is hydrogen or methyl, A is an unbranched or branched alkylene radical having 2 to 10 C atoms and n has a value of 2–50 and (b) a magnesium or zinc compound selected from the group consisting of oxides, hydroxides, carboxylates, enolates and phenates, the component (b) not being an oxide or hydroxide in the case of polyethylene.

2. An organic polymer according to claim 1, containing, as the component (a), a light stabilizer of the formula Ia

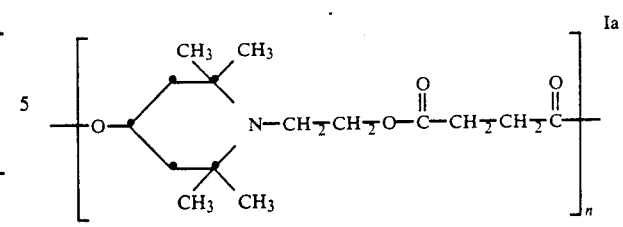

in which n has a value from 5 to 20.

3. An organic polymer according to claim 1, containing, as the component (b), an oxide, an acetylacetonate or a salt of an aliphatic monocarboxylic acid of magnesium or zinc.

4. An organic polymer according to claim 1, containing 0.01 to 5% by weight of the component (a) and 0.005 to 1% by weight of the component (b), in each case relative to the polymer.

5. An organic polymer according to claim 1, which is a polyolefin.

6. An organic polymer according to claim 5, which is a polypropylene.

7. An organic polymer according to claim 1, which, in addition to the components (a) and (b), also contains other stabilizers or other additives customary in plastics technology.

8. A process for stabilizing organic polymers against degradation by light by adding a mixture of stabilizers, characterized in that a mixture is added of (a) a polyalkylpiperidine light stabilizer of the formula I

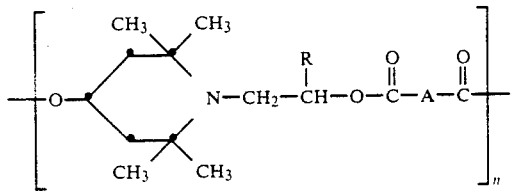

in which R is hydrogen or methyl, A is an unbranched or branched alkylene radical having 2 to 10 C atoms and n has a value from 2 to 50, and (b) a magnesium or zinc compound selected from the group consisting of oxides, hydroxides, carboxylates, enolates and phenates, the component (b) not being an oxide or hydroxide in the case of polyethylene.

* * * * *